United States Patent [19]

Irving

[11] 4,413,637

[45] Nov. 8, 1983

[54] DYNAMIC CIRCUMFERENCE GAGE

[75] Inventor: Christopher Irving, Richmond, Va.

[73] Assignee: Philip Morris Inc., New York, N.Y.

[21] Appl. No.: 319,009

[22] Filed: Nov. 6, 1981

Related U.S. Application Data

[63] Continuation-in-part of Ser. No. 226,569, Jan. 19, 1981, abandoned.

[51] Int. Cl.³ ............................................. A24C 5/18
[52] U.S. Cl. ................................ 131/84 R; 131/66 R; 131/66 A; 131/67; 131/906
[58] Field of Search ...................... 131/69, 67, 906, 68, 131/84 C, 84 B, 84 R, 84 A, 66 R, 66 A

[56] References Cited

U.S. PATENT DOCUMENTS

| | | | |
|---|---|---|---|
| 2,163,415 | 6/1939 | Stephano | 131/906 |
| 3,633,590 | 1/1972 | Pocock | 131/906 |
| 3,645,175 | 2/1972 | Rakowicz | 131/906 |
| 4,010,762 | 3/1977 | Strydom | 131/906 |
| 4,033,360 | 7/1977 | Nienow et al. | 131/906 |
| 4,189,841 | 2/1980 | Loepfe | 33/147 L |

Primary Examiner—V. Millin
Attorney, Agent, or Firm—Arthur I. Palmer, Jr.; Nelson A. Blish

[57] ABSTRACT

A dynamic circumference gage (70) has a spring which maintains contact with moving cigarette rod (74). Strain gages mounted on opposite faces of the spring indicate changes in the circumference of moving cigarette rod (74). Changes in cigarette rod (74) circumference, as indicated by dynamic circumference gage (70), may be used to make adjustments in folder (42) or short tongue (30) to return cigarette rod (74) circumference to within acceptable limits. A second dynamic circumference gage (80) may be located ninety degrees from dynamic circumference gage (70) to provide accurate circumference measurements for out of round cigarettes.

5 Claims, 7 Drawing Figures

DYNAMIC CIRCUMFERENCE GAGE

This application is a continuation-in-part of prior copending application Ser. No. 226,569 filed Jan. 19, 1981 now abandoned.

BACKGROUND OF THE INVENTION

This invention relates to cigarette making machinery in general and more particularly to apparatus providing continuous output indication of the circumference of a cigarette tobacco rod during manufacture of cigarettes.

DESCRIPTION OF THE PRIOR ART

The measurement of rod circumference or diameter is of importance in a number of fields. For example, in the manufacture of cigarettes a parameter of special interest is cigarette rod circumference, a characteristic directly usuable to monitor the degree of uniformity of cross section of an individual cigarette along its length and variations thereof in batches of cigarettes, and hence, to assess whether produced cigarettes meet quality control specifications. Also, cigarette circumference must be carefully controlled so that filter plugs and cigarette rods can be attached to one another neatly and securely.

A number of devices have been used to test cigarette diameter, or circumference, with varying degrees of success. One of the most common methods of testing cigarette rod circumference is the use of pneumatic means wherein the rod to be tested is placed in an orifice of larger predetermined diameter through which air is forced at a predetermined pressure drop. The difference between the pressure drop across the unobstructed orifice and that across the orifice when obstructed by the rod is used as a measure of rod circumference. Such a gaging method lacks accuracy and reliability for some cigarettes with filters with highly porous wrappers or with porous tobacco rod wrappers. An additional disadvantage of this type device is that the rods are tested individually and by the time an incorrect cigarette circumference has been determined a substantial number of defective cigarettes will have been produced.

Another method of measuring cigarette rod circumference is disclosed by Collins, U.S. Pat. No. 3,967,383. This method consists of a tape curved over an intermediate portion into a closed loop. A rod sample to be measured is placed in the closed loop and the ends of the loop are pulled tight, giving an indication of rod circumference. This method also suffers from a time delay problem in that production of cigarettes continues while measurement of a sample rod is made. Also, soft rods may be deformed by this type device and false readings obtained.

Optical devices have also been employed to monitor production of rod shaped articles. Examples of this type device may be found in U.S. Pat. Nos. 4,198,165 and 4,208,578. A drawback associated with this type device is that a fuzzy surface on a porous wrapper can adversely effect the readings on these instruments.

It is, therefore, an object of the present invention to provide a device for continuously measuring circumference of a moving rod during the manufacturing process.

A further object of the present invention is to provide a means for measuring rod circumference which is not adversely affected by rod porosity.

Another object of the present invention is to provide a method of measuring rod circumference without deforming the rod and giving an inaccurate reading.

SUMMARY OF THE INVENTION

According to the present invention, the foregoing and other objects are attained by providing a spring, adjusted to maintain contact with a moving cigarette rod as the moving cigarette rod passes between a guide block and the spring. Changes in cigarette rod circumference cause the spring to flex, which causes changes in resistance of strain gages mounted on the spring, providing indication of changes of cigarette rod circumference.

BRIEF DESCRIPTION OF THE DRAWINGS

A more complete appreciation of the invention and many of the attendent advantages thereof will be readily apparent by reference to the following detailed description when considered in connection with the accompanying drawings wherein.

DESCRIPTION OF THE PREFERRED EMBODIMENT

Figure 1:
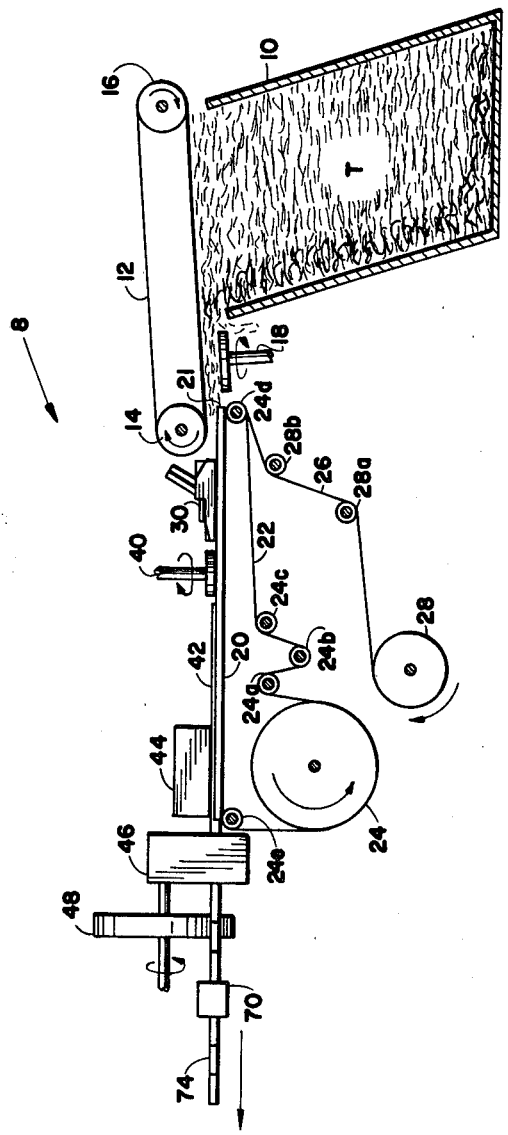
FIG. 1 is a schematic illustration of a cigarette making machine according to the present invention.

Referring now to the drawings and more particularly to FIG. 1, there is illustrated a cigarette making apparatus, known as the MK9 Cigarette Maker and commercially available from the Molins Company, designated generally by reference numeral 8. Cigarette Maker 8 is shown schematically to include tobacco chimney 10 from which tobacco T is blown onto perforated vacuum belt 12, driven by rollers 14 and 16, to convey tobacco T, supported by belt 12, to trimmer knife assembly 18 supported for movement toward or away from the conveyed tobacco to vary the amount of tobacco on belt 12 in accordance with a cigarette weight or density based control signal.

Leftwardly of roller 14, such Molins apparatus includes elongated garniture 20 defining an open channel, not shown, extending longitudinally and of generally semi-cylindrical configuration. Endless garniture tape or belt 22 is fed to upstream tobacco input mouth 21 of the garniture and transported through the garniture 20 by drive wheel 24 over idler rollers 24a–24e. Cigarette paper 26 is fed to mouth 21 atop garniture tape 22 from supply roll or bobbin 28 over idler rollers 28a, 28b, and 24d. Tobacco falls from belt 12 onto paper 26 as vacuum is removed from the belt. On entry of garniture tape 22 in the garniture channel, the garniture imparts generally semi-cylindrical shape thereto, like shape being thereby imparted to paper 26 and the tobacco T deposited thereon from belt 12.

Short tongue 30 of such Molins apparatus is located downstream of garniture mouth 21 and is cooperative with garniture 20 to impart generally cylindrical form to the tobacco T and paper 26 to form cigarette rod 74.

As cigarette rod 74 leaves short tongue 30, a length of cigarette paper extends tangentially from the paper-wrapped rod. Paster wheel 40, applies an adhesive to such extending length of paper whereupon folder unit 42 folds such pasted length over and unit 44 heat seals the rod. The sealed continuous rod now passes through nuclear density gage 46 and is then cut by rod cutoff mechanism 48.

Figure 2:
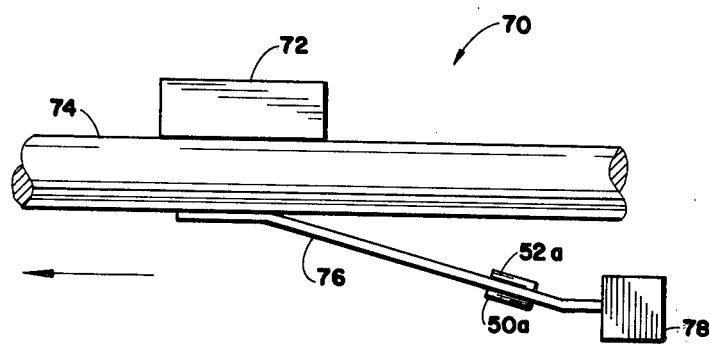
FIG. 2 is a perspective view from above of the dynamic circumference gage of the FIG. 1 apparatus.
Figure 3:
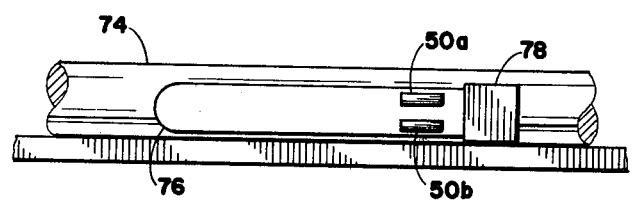
FIG. 3 is a perspective view from the side of the dynamic circumference gage shown in FIG. 2.
Figure 4:
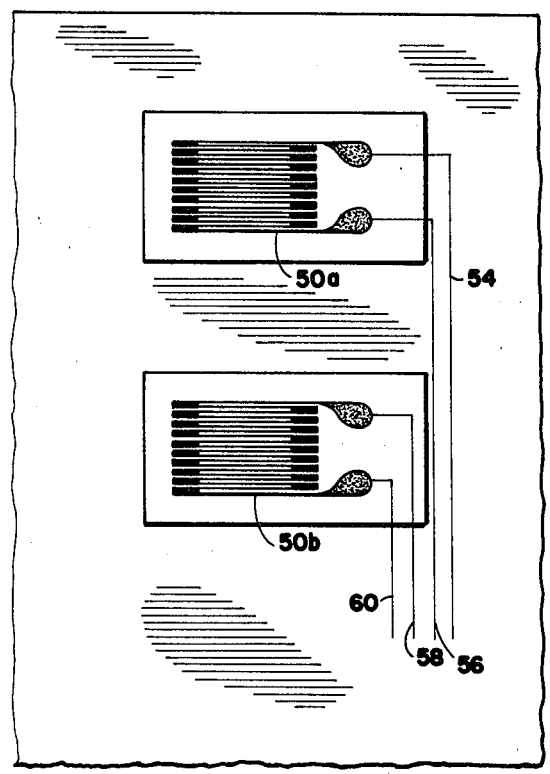
FIG. 4 is a partial plan of the dynamic circumference gage of FIG. 3 with plural strain gages employed in accordance with the invention.

Referring now to FIGS. 2 and 3, there is shown a perspective view of dynamic circumference gage 70 from above in FIG. 2 and from side in FIG. 3. Cigarette rod 74, after it leaves rod cut off mechanism 48, passes between guide block 72 and spring 76. Spring 76 is supported by spring support 78 which may be adjusted to maintain spring 76 in contact with cigarette rod 74. A pair of strain gages 52a and 52b, gage 52b not shown, are placed on one face of spring 76 and another pair of strain gages 50a and 50b are located on the opposite face of spring 76. Strain gages 50a and 50b, gages 52a and 52b are similar, are shown in FIG. 4.

Figure 5:
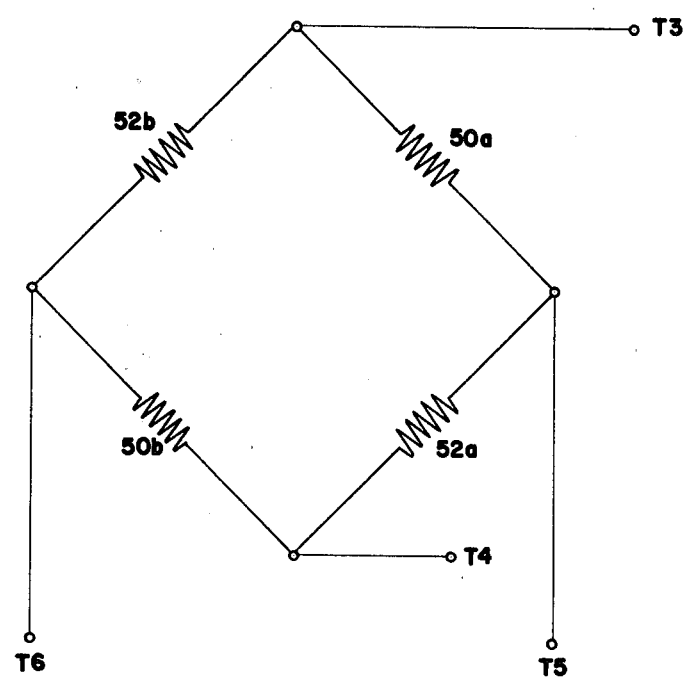
FIG. 5 shows a circuit for use in providing cigarette circumference indication.

The gages are connected as shown in FIG. 5. A full bridge circuit includes one branch having gages 50a and 52a connected in series and another branch having gages 52b and 50b connected in series, the branches being connected in parallel between terminal T-3 and T-4. A power supply is connected across T-3 and T-4 and an output signal is provided by terminals T-5 and T-6. The order of connection of strain gages in the FIG. 5 circuit provides greater signal amplification than mounting a single strain gage on each face of spring 76 would provide. Also, using a bridge circuit will minimize effects of a temperature change.

Spring 76 is mounted on block 78 such that it will be unflexed when there is no cigarette, or a tobacco rod having substantially less diameter than a predetermined desired diameter, passing under spring 76. In such an unflexed position, strain gages on opposed surfaces of spring 76 exhibit equal electrical resistance. When a cigarette rod 74 passes between spring 76 and guide-block 72, as shown in FIG. 2, the side of spring 76 which supports strain gages 50a and 50b will be in compression and the side of spring 76 which supports strain gages 52a and 52b will be in tension. Thus, as the diameter of cigarette rod 74 increases, spring 76 will flex further causing a decrease in the resistance of gages 50a and 50b and an increase in the resistance of gages 52a and 52b. Therefore, the voltage at T-5 with respect to T-4 will increase in magnitude and the voltage at T-6 with respect to T-4 will decrease in magnitude by the same amount. Thus, the voltage change between T-5 and T-6 will be twice that seen at either junction separately.

Changes in cigarette rod 74 circumference, when detected by dynamic circumference gage 70, may be used to reposition folder 42 and hence return cigarette rod 74 circumference to proper values. The adjustment to folder 42 may be made either manually or by automatic means. In practicing the invention the strain gages are preferably constant such as are available commercially as gage series MA from Micro-Measurements, Division of Vishay Intertechnology, Inc., Box 306, Romulus, Mich.

Figure 6:
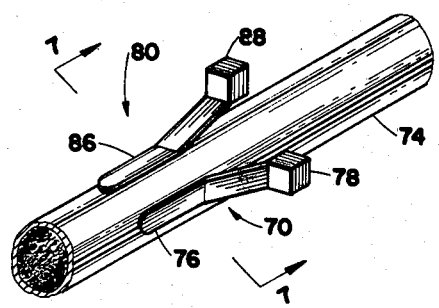
FIG. 6 is a perspective view with two dynamic circumference gages mounted 90° apart.
Figure 7:
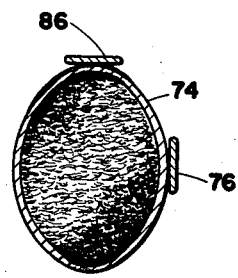
FIG. 7 is a sectional view along lines 7—7 of the apparatus shown in FIG. 6.

Another embodiment of the invention is shown in FIG. 6 wherein a second dynamic circumference gage designated generally by the numeral 80 is located 90° from dynamic circumference gage 70. Second dynamic circumference gage 80 is similar in construction and operation to dynamic circumference gage 70. Use of two dynamic circumference gages will give a more accurate indication of circumference since cigarette rod 74 may be slightly elliptical in shape as shown in FIG. 7.

The output signal from dynamic circumference gage 70 and second dynamic circumference gage 80 will be the true dimension of the cigarette 74 in the direction perpendicular to the contacting surface of the spring. The output of the gages can be used to calculate the circumference of the cigarette using the equation circumference $$= 2\pi \sqrt{\frac{\left(\frac{a}{2}\right)^2 + \left(\frac{b}{2}\right)^2}{2}}$$

where a and b are respectively the major and minor axes of the ellipse. These calculations may be performed automatically as is well known in the art.

I claim:

1. A cigarette making apparatus having a garniture for imparting curvature to a garniture tape and thereby to cigarette paper and tobacco disposed on said tape, and short tongue means engageable with said tobacco and cooperative with said garniture for imparting generally cylindrical shape to said tobacco to form a cigarette rod, a folder means for joining a free end of said cigarette paper to said tobacco rod, improvements therein comprising a dynamic circumference gage downstream of said folder and comprised of a guide block means, a spring means, and strain gage means mounted on said spring such that said strain gage means exhibits stress changes proportional to changes in said spring flexure due to changes in circumference of said cigarette rod.

2. A cigarette making apparatus having a garniture for imparting curvature to a garniture tape and thereby to cigarette paper and tobacco disposed on said tape, and short tongue means engageable with said tobacco and cooperative with said garniture for imparting generally cylindrical shape to said tobacco to form a cigarette rod, a folder means for joining a free end of said cigarette paper to said tobacco rod, improvements therein comprising a first and second dynamic circumference gage, said second dynamic circumference gage located at a position approximately 90° around the circumference of said cigarette from said first dynamic circumference gage, said gages comprised of a guide block means, a spring means, and strain gage means mounted on said spring such that said strain gage means exhibits stress changes proportional to changes in said spring flexure due to changes in circumference of said cigarette rod.

3. A cigarette making apparatus as in claim 1 or claim 2 wherein said strain gage means comprises a first strain gage means and a second strain gage means mounted on opposed sides of said spring means such that said first strain gage means exhibits stress changes of sense opposite to the stress change exhibited by said second strain gage means on movement of said spring means.

4. A cigarette making apparatus as in claim 3 wherein said first and second strain gage means comprise first and second strain gages said invention further comprising circuit means for connecting in a first series circuit the first strain gage of said first strain gage means and the first strain gage of said second strain gage means, for connecting in a second series circuit the second strain gage of said second strain gage means and the second gage of said first strain gage means, for connecting said first series circuit in parallel circuit with said second series circuit, for applying a voltage across said parallel circuit and for providing an output signal indicative of the voltage difference between the respective junctions of strain gages in said first and second series circuits.

5. A cigarette making apparatus as in claim 1 wherein a second dynamic circumference gage is located at a position approximately 90° around the circumference of said cigarette rod from said dynamic circumference gage.

* * * * *